US012557405B2

(12) United States Patent
Yang et al.

(10) Patent No.: US 12,557,405 B2
(45) Date of Patent: Feb. 17, 2026

(54) STRUCTURE AND METHOD FOR BACKSIDE-ILLUMINATED IMAGE DEVICE

(71) Applicant: Taiwan Semiconductor Manufacturing Company, Ltd., Hsin-Chu (TW)

(72) Inventors: Hao-Lin Yang, Kaohsiung (TW); Ching-Chun Wang, Tainan (TW); Tzu-Jui Wang, Kaohsiung County (TW); Chen-Jong Wang, Hsin-Chu (TW); Dun-Nian Yaung, Taipei (TW)

(73) Assignee: TAIWAN SEMICONDUCTOR MANUFACUTURING COMPANY, LTD, Hsinchu (TW)

( * ) Notice: Subject to any disclaimer, the term of this patent is extended or adjusted under 35 U.S.C. 154(b) by 731 days.

(21) Appl. No.: 17/879,536

(22) Filed: Aug. 2, 2022

(65) Prior Publication Data
US 2023/0317760 A1    Oct. 5, 2023

Related U.S. Application Data

(60) Provisional application No. 63/324,779, filed on Mar. 29, 2022.

(51) Int. Cl.
*H10F 39/12* (2025.01)
*H10F 39/00* (2025.01)
*H10F 39/18* (2025.01)

(52) U.S. Cl.
CPC ......... *H10F 39/199* (2025.01); *H10F 39/014* (2025.01); *H10F 39/18* (2025.01); *H10F 39/802* (2025.01); *H10F 39/811* (2025.01)

(58) Field of Classification Search
CPC ......... H10F 39/014; H10F 39/18–1898; H10F 39/811
See application file for complete search history.

(56) References Cited

U.S. PATENT DOCUMENTS

2012/0261730 A1* 10/2012 Chen ................... H10F 39/014
                                                                438/57
2016/0043132 A1*  2/2016 Ihara .................... H10F 39/199
                                                                257/291

(Continued)

FOREIGN PATENT DOCUMENTS

KR      20210060288 A     5/2021

*Primary Examiner* — Kevin Parendo
(74) *Attorney, Agent, or Firm* — HAYNES AND BOONE, LLP

(57) ABSTRACT

An image sensor structure that further includes a first substrate having a front side and a back side; a photodetector disposed on the front side of the first substrate and spanning a dimension Dp along a first direction; a gate electrode formed on the front side of the first substrate and partially overlapping the photodetector; a doped region as a floating diffusion region formed on the front side of the first substrate and disposed next to the photodetector; and an interconnect structure disposed on the front surface of the first substrate and overlying the gate electrode. The interconnect structure includes a second metal layer over a first metal layer, the second metal layer further includes a first and second metal features distanced a distance Ds along the first direction, the first metal feature is electrically connected to the doped feature, and a first ratio Ds/Dp is greater than 0.3.

20 Claims, 12 Drawing Sheets

(56) References Cited

U.S. PATENT DOCUMENTS

| | | |
|---|---|---|
| 2016/0358967 A1 | 12/2016 | Madurawe et al. |
| 2017/0221954 A1 | 8/2017 | Madurawe et al. |
| 2018/0213205 A1 | 7/2018 | Oh |
| 2021/0193706 A1* | 6/2021 | Kim ...................... H10F 39/199 |
| 2021/0375966 A1* | 12/2021 | Baba ................... H10F 39/8037 |
| 2022/0013552 A1* | 1/2022 | Baek ..................... H10F 39/813 |
| 2022/0238580 A1* | 7/2022 | Gao ....................... H04N 25/77 |
| 2022/0406825 A1* | 12/2022 | Jin ...................... H10F 39/8037 |

\* cited by examiner

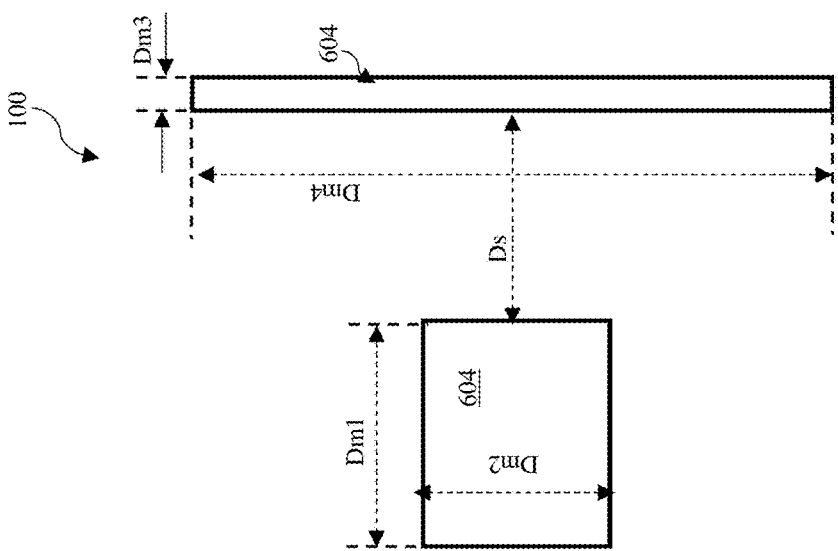
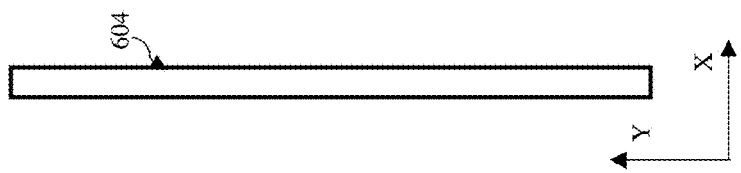
Fig. 9
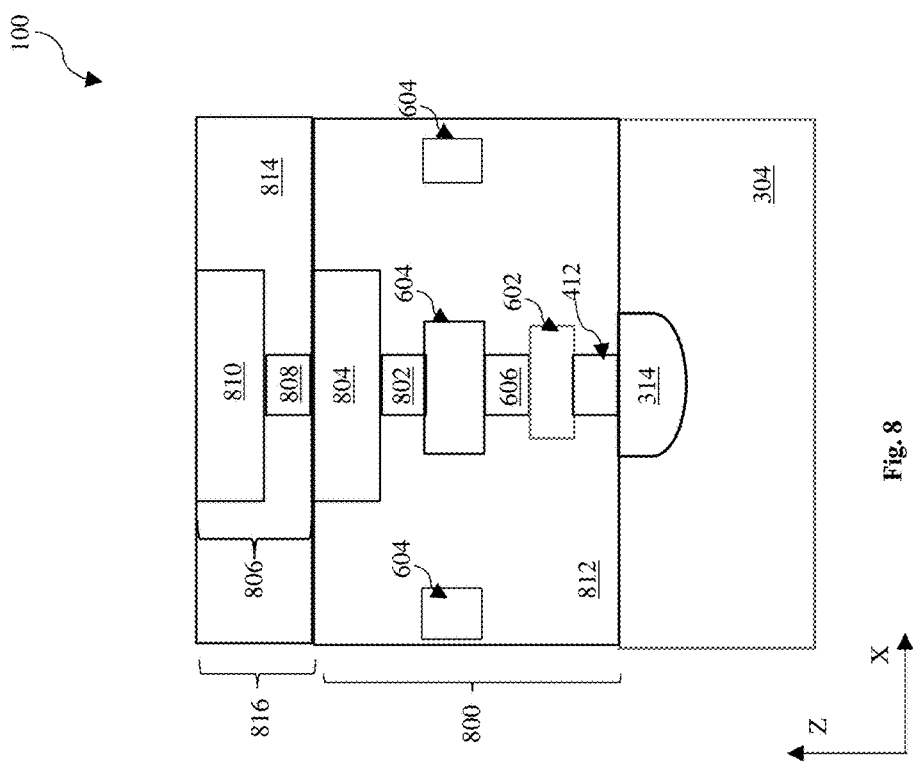
Fig. 8

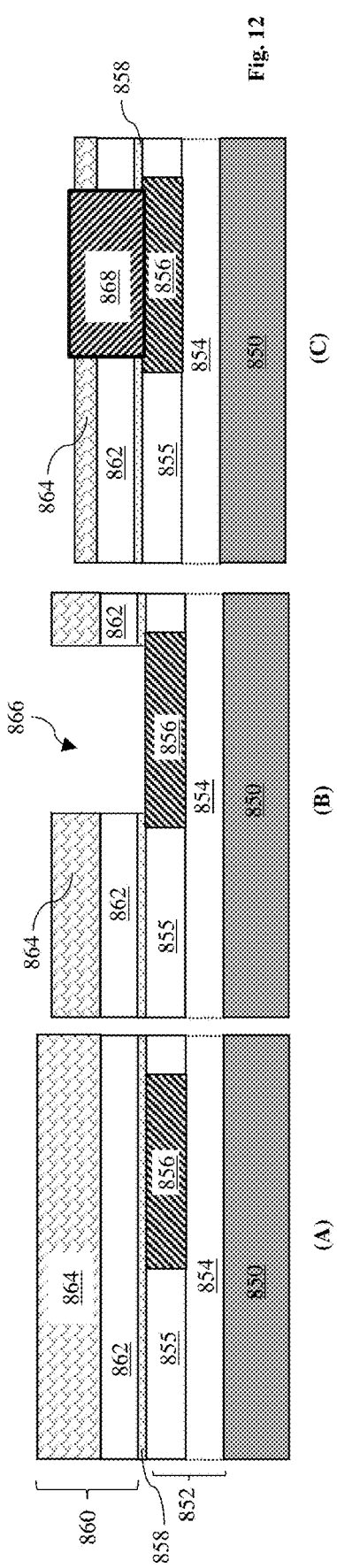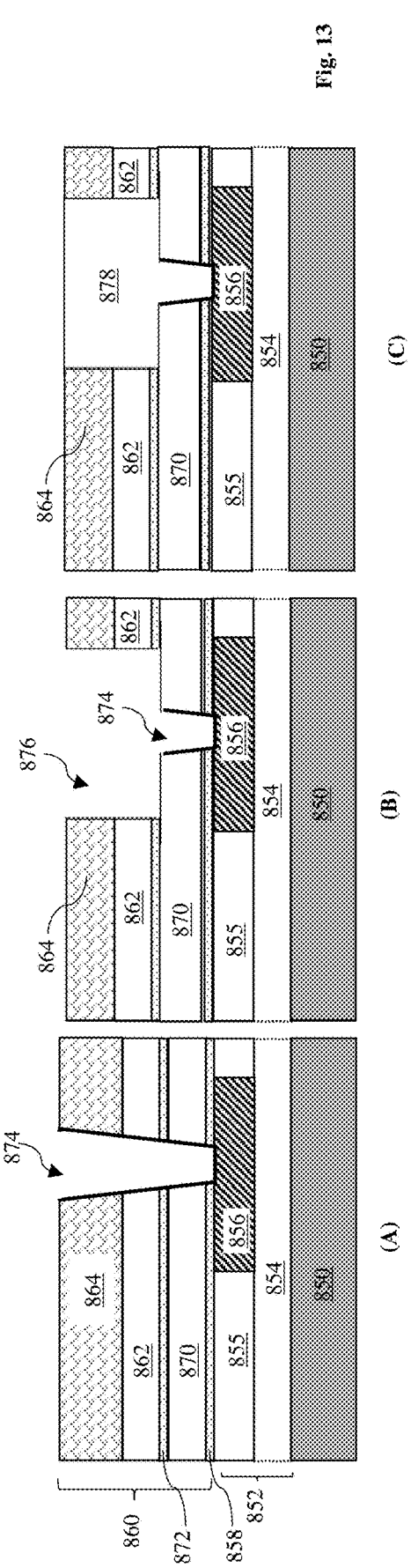

STRUCTURE AND METHOD FOR BACKSIDE-ILLUMINATED IMAGE DEVICE

CROSS-REFERENCE

This application claims priority to U.S. Provisional Patent Application Ser. No. 63/324,779 filed Mar. 29, 2022, the entire disclosure of which is hereby incorporated herein by reference.

BACKGROUND

The present disclosure relates generally to semiconductor devices and, more particularly, to backside-illuminated image sensors.

In semiconductor technologies, backside-illuminated sensors are used for sensing a volume of radiation (e.g. light) projected towards the back surface of a substrate. To do this, an image sensor device uses an array of image sensor elements (e.g. pixels). Each image sensor element includes at least one radiation sensing element, described herein, as a photodetector. The photodetectors may be formed on the front side of the substrate, the substrate being thin enough to allow the radiation incident on the back surface of the substrate to reach the photodetectors. However, the conversion gain of the image sensor device is still challenging and is impacted and degraded by many factors and parameters. As such, an improved backside-illuminated image sensor is desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 4A, 4B, 5A, 5B, 6, 7, 8 and 9 are top views of the image sensor device, constructed in accordance with some embodiments.

FIGS. 10, 11, 12 and 13 are cross-section views of the image sensor device, constructed in accordance with some embodiments.

DETAILED DESCRIPTION

Figure 1:
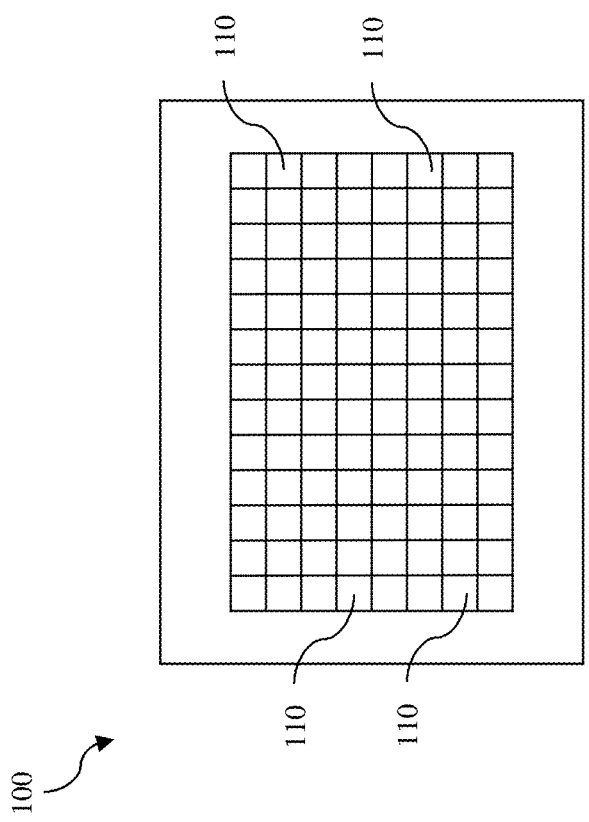
FIG. 1 is a top view of a sensor device including a plurality of image sensor elements (or pixels).

The present disclosure relates generally to image sensors and more particularly, to a backside-illuminated image sensor. The following disclosure provides many different embodiments, or examples, for implementing different features. Reference numerals and/or letters may be repeated in the various examples described herein. This repetition is for the purpose of simplicity and clarity and does not in itself dictate a relationship between the various disclosed embodiments and/or configurations. Further, specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. Moreover, the formation of a feature on, connected to, and/or coupled to another feature in the present disclosure may include embodiments in which the features are formed in direct contact, and may also include embodiments in which additional features may be formed interposing the features, such that the features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one feature relationship to another feature. The spatially relative terms are intended to cover different orientations of the device including the features. Still further, when a number or a range of numbers is described with "about," "approximate," and the like, the term is intended to encompass numbers that are within a reasonable range including the number described, such as within +/−10% of the number described, or other values as understood by person skilled in the art. For example, the term "about 5 nm" encompasses the dimension range from 4.5 nm to 5.5 nm.

Referring to FIG. 1, an image sensor device 100 provides an array of image sensor elements 110 (e.g. pixels). The image sensor device 100 may be a complimentary metal oxide semiconductor (CMOS) image sensor (CIS) or active pixel sensor. In the disclosed embodiment, the image sensor device 100 is a backside-illuminated (BSI) sensor. The image sensor elements 110 include photodetectors for sensing and measuring an intensity or brightness of radiation. In an embodiment, a photodetector included in an image sensor element 110 includes a photodiode. In a further embodiment, a photodetector includes a pinned photodiode. Other examples of photodetectors include photogate detectors, phototransistors, and/or other detectors known in the art. The image sensor elements 110 may also include reset transistors, source follower transistors, selector transistors, and/or transfer transistors. In several of the embodiments illustrated below, image sensor elements are depicted as four transistor elements (or 4T structure), however various other configures are possible, including, for example, a 5T structure. Additional circuitry and input/outputs are typically provided adjacent to the array of image sensor elements 110 for providing an operation environment for the image sensor elements 110 and for supporting external communications with the image sensor elements 110. For simplicity, image sensors including a single image sensor element are described in some figures; however, typically an array of such image sensor elements may form a sensor device, as illustrated in FIG. 1.

Figure 2:
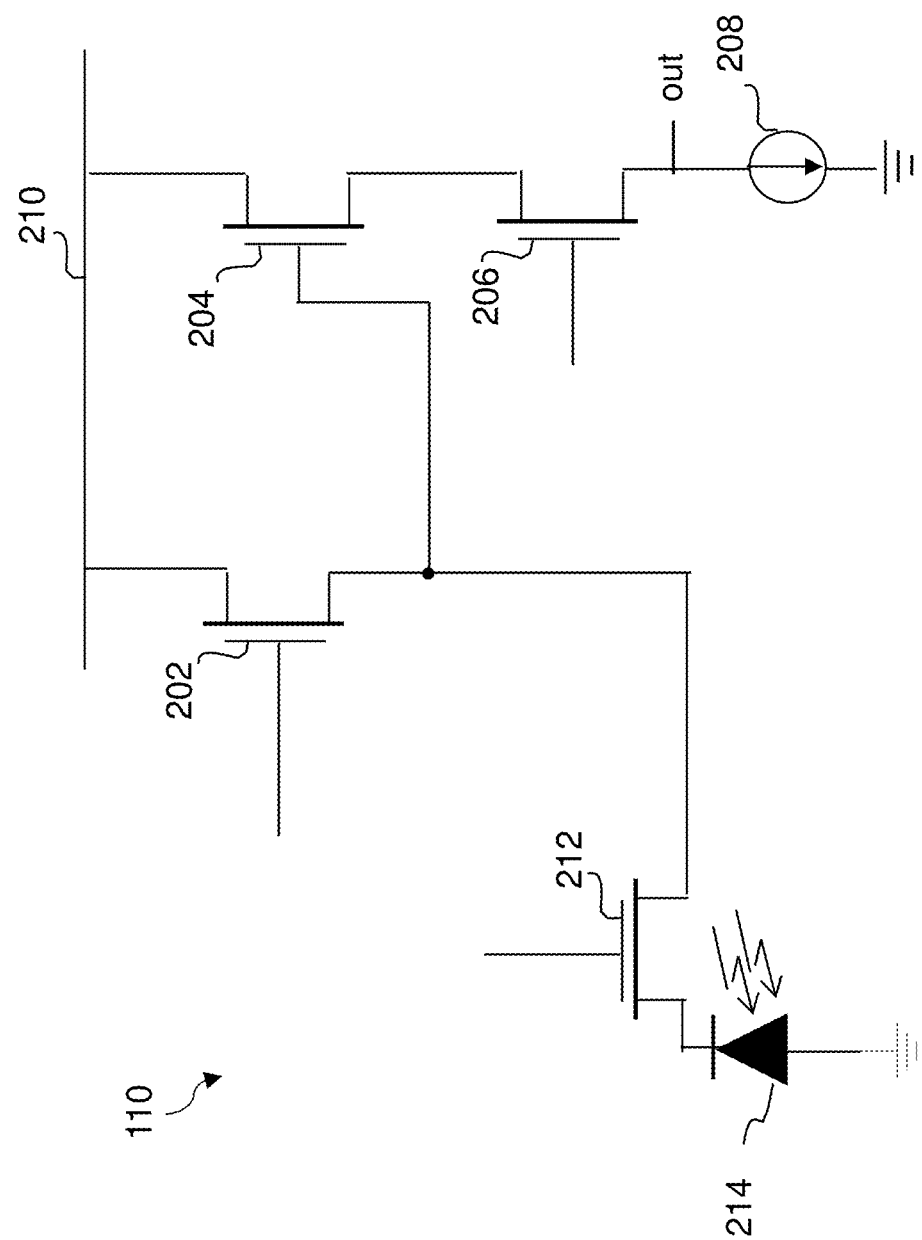
FIG. 2 is a schematic of an embodiment of an image sensor element.

Referring now to FIG. 2, a schematic of an image sensor element 100 is illustrated. The image sensor element 100 includes a reset transistor 202, a source follower transistor 204, a selector transistor 206, a transfer transistor 212 (or transfer gate transistor), and a photodetector 214, illustrated as a photodiode. The photodetector 214 is connected in series with the transfer transistor 212. The transfer transistor 212 is connected in series with the reset transistor 202. The gate of the source follower transistor 204 is connected to the source of the reset transistor 202. The drain of the source follower transistor 204 is connected to a power supply 210. The selector transistor 206 is connected in series to the source follower transistor 204. The reset transistor 202 can act to reset the image sensor element 110, e.g. by resetting the floating diffusion region (or floating node) described below. The source follower transistor 204 may allow the voltage of the image sensor element 110 to be observed without removing the accumulated charge. The selector transistor 206 may be a row-select transistor and allow a single row of image sensor elements in an array, such as illustrated in the array of FIG. 1, to be read when the selector transistor 206 is turned on. In an alternative embodiment, the gate electrode of the selector transistor 206 is connected to a row select line and a source/drain feature of the selector transistor 206 is connected to a column select line. The drain of the transfer transistor 212 includes a floating diffusion region, described below. The transfer transistor 212 can move signal charges accumulated in the photodetector 214 to the floating diffusion region. For example, the transfer gate (or gate of the transfer transistor) controls the transfer of electrons between the photodetector 214 and the floating diffusion region. As the floating diffusion region is coupled to the gate of the source follower transistor 204, if the selector transistor 206 is turned on (i.e. the row is selected), data is output from the image sensor element. In an embodiment, the transfer transistor 212 allows for correlated double sampling. The photodetector 214 is coupled to ground. In some embodiments, a constant current source 208 may be also included in the image sensor element 110.

Figure 3A:
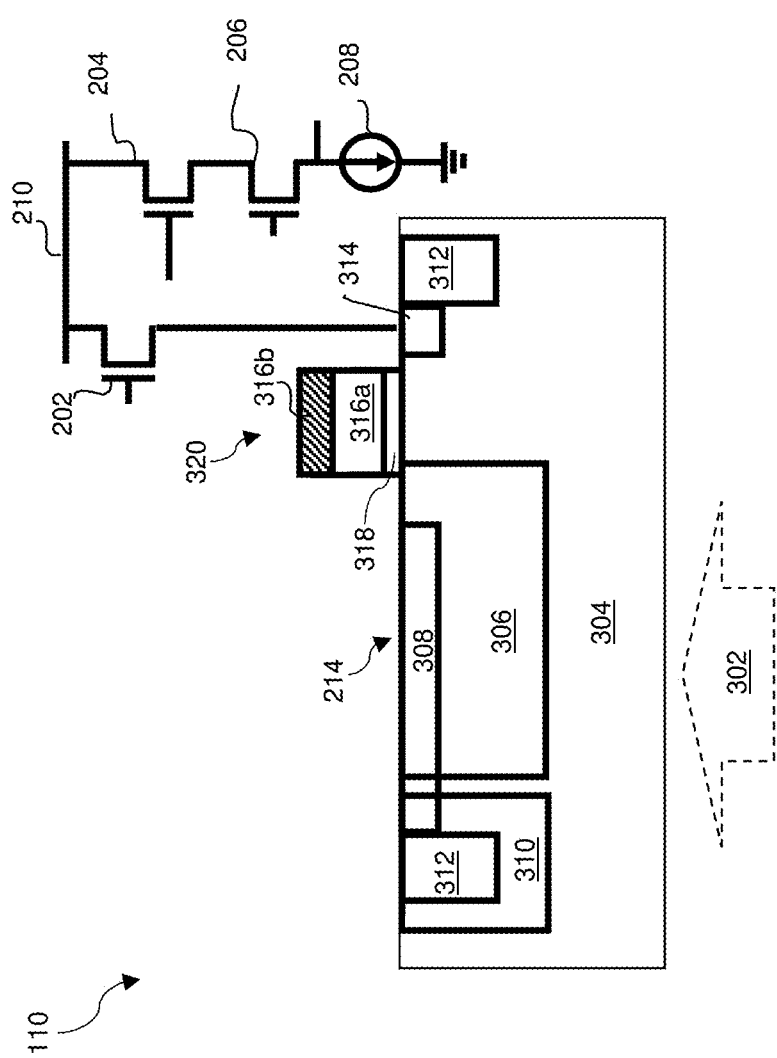
FIG. 3A is a cross-section of an embodiment of an image sensor element constructed in accordance with some embodiments.

Referring now to FIG. 3A, a cross-section of an image sensor element 110 is illustrated. The image sensor element 110 includes a transfer transistor and a photodetector 214 depicted in cross section, as described in detail below, and the reset transistor 202, the source follower transistor 204, the selector transistor 206, the current source 208, and the power supply 210 depicted in schematic form. The image sensor element 110 includes a substrate 304, a photodetector including a photogeneration region 306 and an implant region 308 (illustrated as a pinned photodiode), a floating diffusion region (or floating node) 314, in addition to a well region 310 and isolation features 312, such as shallow trench isolation (STI) features. In an embodiment, the image sensor element 110 is configured such that the substrate 304 includes a p-type region, the photogeneration region 306 is an n type region, and the implant region 308 is a p type region. In furtherance of the embodiment, the floating diffusion region 314 is a n-type doped region, formed by a suitable method, such as ion implantation. The floating diffusion region 314 may have a doping concentration greater than that of the photogeneration region 306 and therefore is referred to as N+ doped region. The well region 310 may be a p-type well helpful to provide isolation between image sensor elements. The image sensor element 110 is configured to measure radiation incident on the back side of the substrate 304, as illustrated by radiation beam 302. The transfer transistor includes a transfer gate stack 320. The transfer gate stack 320 includes a gate dielectric layer 318 and a gate electrode 316 disposed on the gate dielectric layer 318. The gate dielectric layer 318 includes one or more dielectric materials, such as silicon oxide, silicon nitride, high-k dielectric material, other suitable dielectric material or a combination thereof. The gate electrode 316 includes one or more conductive material, such as a polysilicon layer 316a and a silicide layer 316b. Alternatively, the gate electrode 316 may include other suitable conductive material, such as aluminum, copper, tungsten, ruthenium, nickel, other suitable or a combination thereof.

Particularly, the gate electrode 316 is designed to include a conductive layer 316b as an optically reflective layer. The gate electrode 316 is partially overlying on the photodetector and can function to reflect the radiation to increase the conversion gain. A portion of the radiation incident on the back surface of the substrate is reflected by the optically reflective material of the gate electrode 316. The reflected radiation is directed towards the photodetector. In particular, the reflected radiation is that radiation that was not absorbed by the substrate including the photodetector as it first passed from the backside of the substrate towards the gate.

In various embodiments, the reflective layer 316b may include a silicide, such as nickel silicide, cobalt silicide, tungsten silicide, tantalum silicide, titanium silicide, platinum silicide, erbium silicide, palladium silicide, and/or combinations thereof. In an embodiment, the silicide is formed by depositing a metal layer including a metal that can form a silicide such as nickel, cobalt, tantalum, titanium, platinum, erbium, palladium, and/or tungsten. The metal may be deposited using conventional processes such as physical vapor deposition (PVD) (sputtering), chemical vapor deposition (CVD), plasma-enhanced chemical vapor deposition (PECVD), atmospheric pressure chemical vapor deposition (APCVD), low-pressure CVD (LPCVD), high density plasma CVD (HDPCVD), or atomic layer CVD (ALCVD). The metal is then annealed to form silicide. The annealing may use a rapid thermal anneal (RTA) in a gas atmosphere such as Ar, He, $N_2$, or other inert gas. A second annealing may be required to make a stable silicide. The un-reacted metal is then removed. In an embodiment, the silicide is formed by a self-aligned silicide process (salicide process). Alternatively, the optically reflective layer 316b may include another optically reflective material, such as a metal, including for example, a metal nitride. Examples of metals that may be included in the optically reflective layer 316b include copper, aluminum, tungsten, tantalum, titanium, nickel, cobalt, and/or other suitable metals.

The image sensor element 110 may be disadvantageous in that front illuminated sensors may provide for lower fill factor (e.g. photodetector exposed area per pixel) and higher destructive interference than a backside-illuminated sensor. Furthermore, the image sensor element 110 may include issues such as a barrier to transfer of charges accumulated in the photogeneration region 306. That is, due to the close proximity of the implant region 308 and the p-type substrate 304, the charges accumulated in photogeneration region 306 may experience a barrier (e.g. resistance) to transfer to the floating diffusion region 314. This barrier may result from the influence of the p type implant region 308 on the transfer transistor. Such a barrier may lead to the image sensor element 110 experiencing image lag.

Figure 3B:
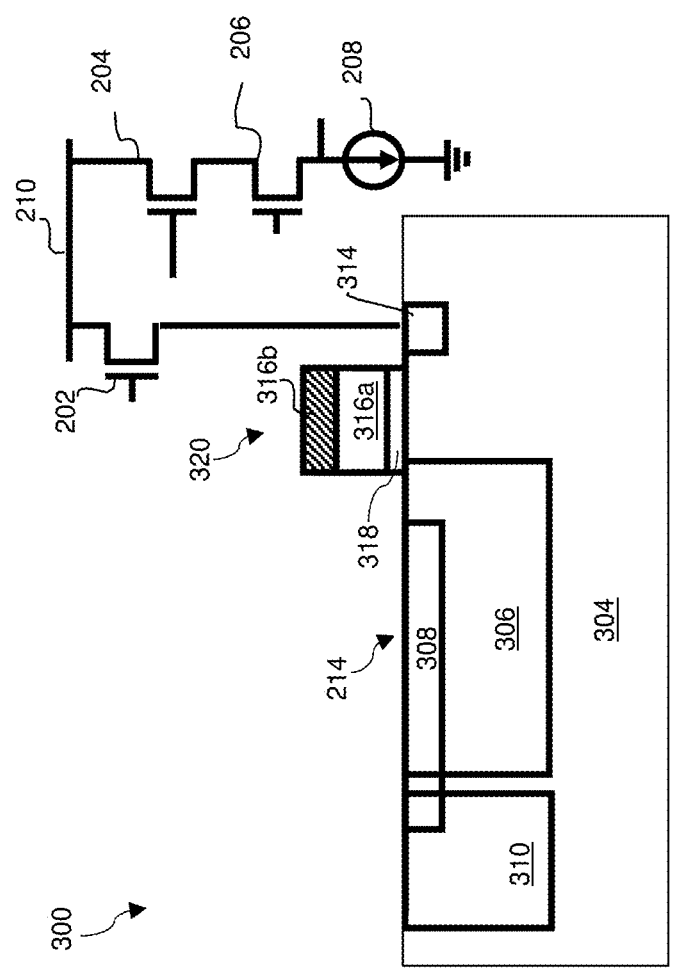
FIG. 3B is a cross-section of an embodiment of an image sensor element constructed in accordance with some embodiments.

The image sensor element 110 may have a different structure with more or less features or alternative features, such as an image sensor element 110 illustrated in FIG. 3B in a cross-sectional view, constructed in accordance with some embodiments. The image sensor element 110 in FIG. 3B is similar to the image sensor element 110 in FIG. 3A. However, the isolation features 312 may be eliminated or configured differently, as described below.

Figure 4B:
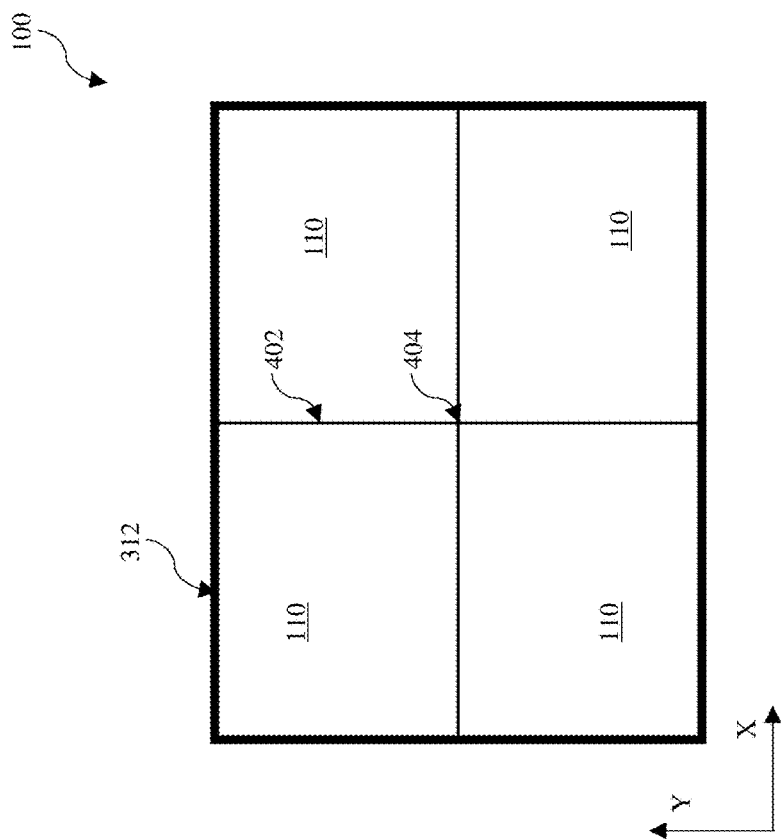
Figure 4A:
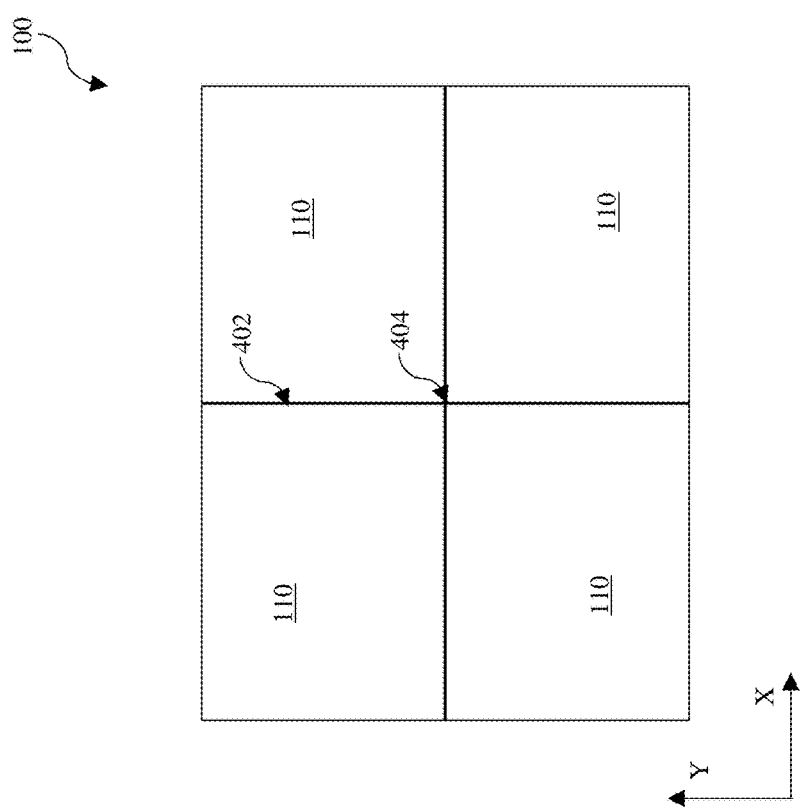

Referring now to FIGS. 4A and 4B, illustrated is an image sensor device 100 in a top view constructed in accordance with some embodiments. The image sensor device 100 includes a plurality of image sensor elements (pixels) 110 formed on a substrate 304. Only four image sensor elements 110 are illustrated in FIG. 4A. It is not intended to be limiting. The image sensor device 100 may include more image sensor elements 110, such as 8, 12, 16 image sensor elements 110, and etc. boundary lines of the image sensor elements 110 are referred to by the numeral 402. Four image sensor elements 110 are configured in an array such that four image sensor elements 110 share a common vertex 404. Four image sensor elements 110 may be separated and isolated from each other by isolation features 312. Alternatively, four image sensor elements 110 contact each other without interruption by isolation features 312, such as illustrated in FIG. 4A, or are collectively surrounded by the isolation features 312, in as in FIG. 4B. The structure of the Four image sensor elements 110 are further described in detail below according to some embodiments.

Figure 5B:
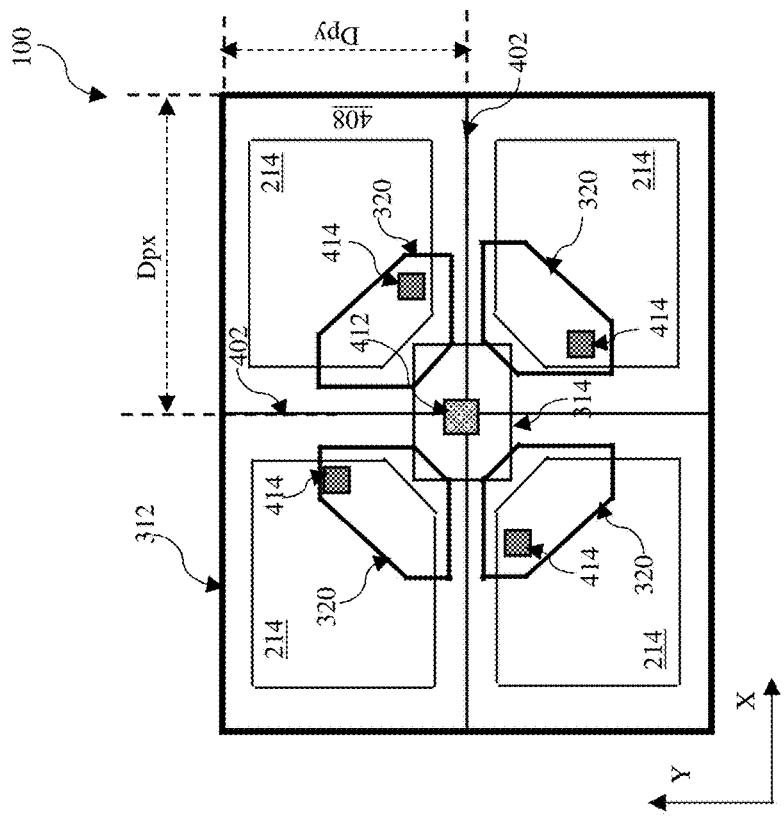
Figure 5A:
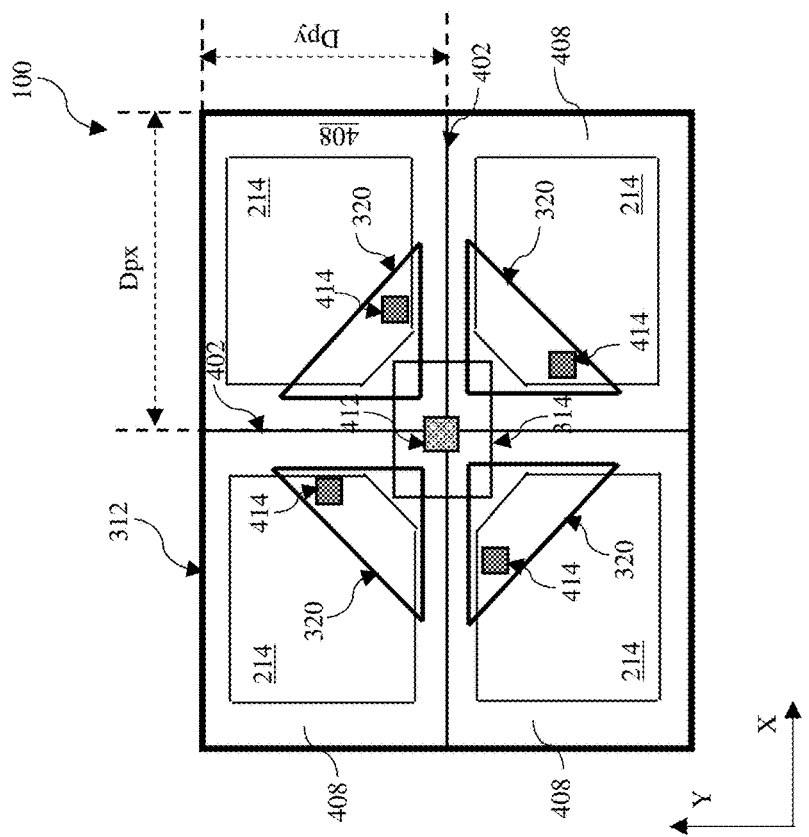

Referring now to FIGS. 5A and 5B, illustrated is an image sensor device 100 in a top view constructed in accordance with some embodiments. The image sensor device 100 includes four image sensor elements 110 configured in an array as described above in FIGS. 4A and 4B. Each image sensor element 110 includes a photodetector 214. In some embodiments, the photodetector 214 is a photodiode. In some embodiments, the photodetector 214 is a pinned-photodiode, such as the pinned-photodiode having a photo-generation region 306 and an implant region 308 described in FIGS. 3A and 3B. The photodetector 214 is designed with a larger area for enhanced conversion gain (CG). The photodetector 214 may include a proper shape, such as a polygon occupying substantial area of the image sensor element 110. In some embodiments, the photodetector 214 is formed in a doped well 408, such as a p-type doped well.

Each image sensor element 110 further includes a transfer transistor 212 having a gate stack 320 disposed on the front side of the substrate 304. The gate stack 320 includes a gate dielectric layer 318 and a gate electrode 316 disposed on the gate dielectric layer 318. The gate stack 320 may have any proper shape and size to tune the coupling between the gate electrode 316 and the channel underlying the gate stack 320. In some embodiments, the gate stack 320 has a triangle shape as illustrated in FIG. 5A. In some embodiments, the gate stack 320 has a polygon shape as illustrated in FIG. 5B. The gate stack 320 is partially disposed on the photodetector 214.

Each image sensor element 110 also includes a floating diffusion region 314 disposed in a cell corner adjacent the common vertex 404. Particularly, the floating diffusion regions 314 of the four image sensor elements 110 are merged together as a common floating diffusion region 314 centered at the common vertex 404. The common floating diffusion region 314 may have any proper shape, such as a square (as illustrated in FIGS. 5A and 5B) or a polygon, such as an octagon. In the disclosed embodiment, the gate stack 320 of each image sensor element 110 is partially disposed and overlying the common floating diffusion region 314.

The image sensor device 100 further includes an interconnect structure formed on the front side of the substrate 304. The interconnect structure is disposed on various features, such as gate stacks 320 and photodetectors 214. In the disclosed embodiments, the interconnect structure includes multiple metal layers, therefore is referred to as multilayer interconnect structure. The interconnect structure includes metal lines distributed in one or more metal layers to provide horizontal routing. The interconnect structure also includes contacts (or contact features) to provide connections among the substrate to the metal lines. The interconnect structure further includes vias (or via features) to provide vertical connection between metal lines of the adjacent metal layers. The interconnect structure is configured to couple various features according to the specification of the image sensor device 100. Various conductive features (metal lines, contacts, and vias) of the interconnect structure may include aluminum, aluminum/silicon/copper alloy, copper, tungsten, titanium, titanium nitride, tantalum, tantalum nitride, polysilicon, metal silicide, or combinations thereof. Above aluminum interconnects may be deposited by sputtering, chemical vapor deposition (CVD), or combinations thereof. Other manufacturing processes, including photolithography and etching, may be used to pattern conductive materials for vertical connections (vias and contacts) and horizontal connections (conductive lines). Still other manufacturing processes such as thermal annealing may be used to form metal silicide. The copper multilayer interconnect may comprise copper, copper alloy, titanium, titanium nitride, tantalum, tantalum nitride, tungsten, polysilicon, metal silicide, or combinations as used for advanced technology nodes. The copper multilayer interconnect may be formed using a dual damascene process. The metal silicide used in multilayer interconnects may include nickel silicide, cobalt silicide, tungsten silicide, tantalum silicide, titanium silicide, platinum silicide, erbium silicide, palladium silicide, or combinations thereof. In some embodiments, various conductive features of the interconnect structure may additionally or alternatively include nickel, ruthenium, cobalt, other suitable conductive material, or a combination thereof. In the disclosed embodiments, the interconnect structure includes two or more metal layers, such as a first metal layer and a second metal layer over the first metal layer. The interconnect structure further includes contacts between the substrate 304 and the first metal layer, and first vias disposed between the first and second metal layers, such as described below in FIG. 8. The interconnect structure is embedded in one or more dielectric materials, such as silicon oxide, silicon nitride, low-k dielectric material, other suitable dielectric material or a combination thereof. The interconnect structure is further described in detail below.

Still referring to FIGS. 5A and 5B, various contacts are formed on the gate stacks 320 and the common floating diffusion region 314. Particularly, a contact 412 is landing on the common floating diffusion region 314, and contacts 414 are landing on gate electrodes 316 of image sensor elements 110, respectively. Metal lines and vias are described below with other figures. In the following figures, the gate stacks 320 are illustrated with a particular shape, such as triangle shape. However, it is not intended to be limiting. The gate stacks 320 may have other suitable shapes, such as polygon.

Figure 6:
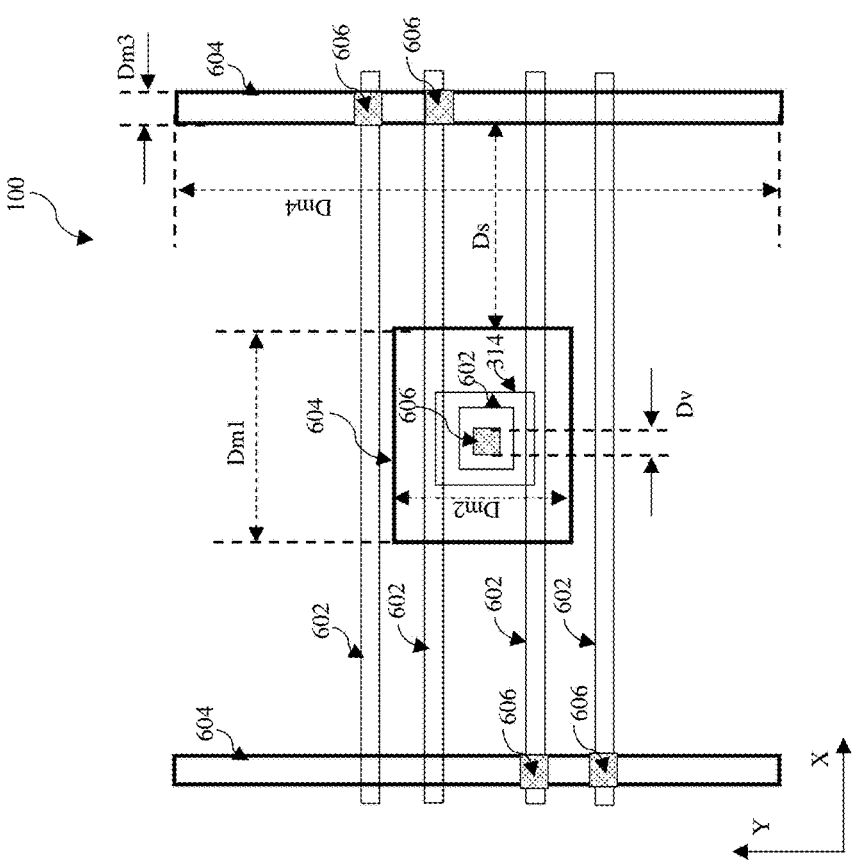

Referring to FIG. 6, the image sensor device 100, in portion, is illustrated in a top view according to some embodiments. Particularly, FIG. 6 illustrates various conductive features of the interconnect structure. Some features, such as contact 412 landing on the common floating diffusion region 314, are not included for better viewing. As described above, the interconnect structure includes a first metal layer, a second metal layer over the first metal layer, a third metal layer over the second metal layer, and etc. In FIG. 6, the image sensor device 100 includes first metal lines 602 of the first metal layer, second metal lines 604 of the second metal layer, and first vias 606 disposed between the first and second metal layers. For better illustration, various conductive features are drawn to be transparent so that underlying features are visible in the top view. In the disclosed embodiments, the first metal lines 602 are longitudinally oriented along X direction and the second metal lines 604 are longitudinally oriented along Y direction, which is orthogonal to X direction. The first vias 606 are positioned on the intersections of the first metal lines 602 and the second metal lines 604 and provide vertical connections to the corresponding first and second metal lines. Especially, one of the second metal lines 604 is designed with different shape and is positioned to electrically connect to the common floating diffusion region 314. The first vias 606 each spans a dimension Dv as illustrated in FIG. 6. In some embodiments, the first vias 606 may have a square shape. In alternative embodiments, the first vias 606 may have other shape, such as a rectangular shape. In this case, the first vias 606 may spans different dimensions, such as Dvx along X direction and Dvy along Y direction. In this case, another parameter is defined as Dv=Max (Dvx, Dvy).

Figure 7:
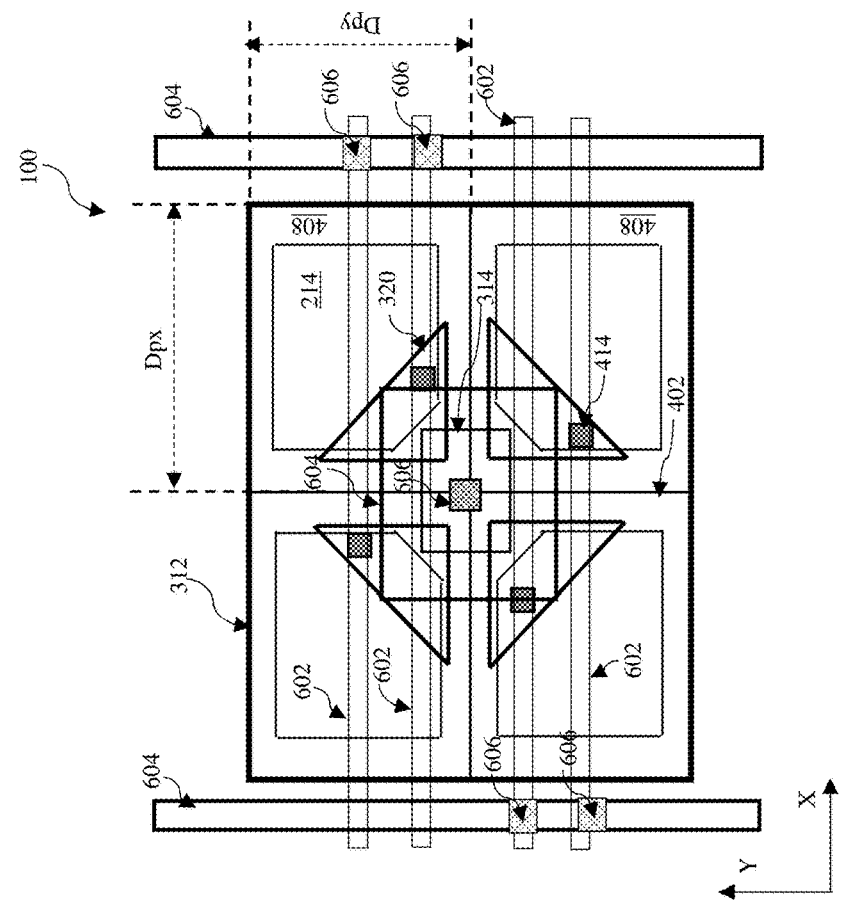

This is further illustrated in FIG. 7 in a top view according to some embodiments. Various conductive features in FIG. 6 and device features in FIG. 5A are collectively illustrated in FIG. 7. Some features, such as contact 412 landing on the common floating diffusion region 314, are not included for better viewing. In FIG. 7, illustrated first metal lines 602 are connected to respective gate electrodes 316 of the transfer transistors 212 through contacts 414. Illustrated second metal lines 604 includes two longitudinal lines and one second metal line 604 disposed between the two longitudinal second metal lines 604. In the disclosed embodiment, the two longitudinal second metal lines 604 are connected to the gate electrodes 316 of the transfer transistors 212 through first vias 606, first metal lines 602 and contacts 414. In some embodiments, the two longitudinal second metal lines 604 are connected to the photodetectors 214 through first vias 606, first metal lines 602 and contacts 414. Particularly, the second metal line 604 between the two longitudinal second metal lines 604 is electrically connected to the common floating diffusion region 314 through corresponding first via 606, first metal line 602 and contact 412. In the disclosed embodiment, the second metal line 604 is designed to be a square for better alignment to the underlying first via 606 and increased contact area.

Various conductive features connected to the common floating diffusion region 314 are further illustrated in FIG. 8 in a sectional view according to some embodiments. In the disclosed embodiment, the interconnect structure 800 includes contacts 412 and 414 (not shown), the first metal lines 602 over the contacts, first vias 606 over the first metal lines 602, second metal lines 604 over first vias 606, second vias 802 over second metal lines 604, and third metal lines 804 over second vias 802. The image sensor device 100 further includes bonding structure 816. In the disclosed embodiment, the interconnect structure 800 includes three metal layers. However, it is only an illustrative example and is not intended to be limiting. It may have any number of metal layers, such as two metal layers, four metal layers, five metal layers and etc. Various conductive features of the interconnect structure 800 are disposed in one or more dielectric material layers 812, such as silicon oxide, silicon nitride, a low-k dielectric material or a combination thereof.

The bonding structure 816 is disposed on the top metal layer (third metal lines 804 in the present embodiment). The bonding structure 816 includes bonding features 806 formed in a passivation layer 814, which further includes one or more dielectric materials to provide passivation and protection to the circuits and interconnect structure from the environment, such as moisture and chemicals. In some embodiments, the passivation layer 814 may include silicon oxide, silicon nitride, other suitable passivation material or a combination thereof. The bonding features 806 may include any suitable bonding technology and suitable structure. For example, the bonding features 806 each include a redistribution layer 808 for routing the metal lines of the top metal layer to a bonding pad 810. In some embodiments, the bonding structure 816 includes other conductive features designed to be connected to metal traces on another substrate, which will be described later in FIGS. 12 and 13.

Second metal lines 604 are further illustrated in FIG. 9 in a top view according to some embodiments. Collectively referring to FIGS. 5A~9, the interconnect structure is further described and defined. The image sensor element 110 spans a first dimension Dpx along X direction and a second dimension Dpy along Y direction. In some embodiments, the two dimensions Dpx and Dpy of the image sensor element 110 are similar, such as a Dpx/Dpy ranging between 0.9 and 1.1. In some examples, a relative difference between Dpx and Dpy, defined as 2|Dpx−Dpy|/(Dpx+Dpy), is less than 10%. In some examples, another parameter is defined as Dp=Max (Dpx, Dpy).

Referring to FIG. 9, second metal lines 604 in the second metal layer include two longitudinal second metal lines 604 spaced away along X direction and a second metal line 604 (referred to as polygon metal feature 604) interposed between the two longitudinal second metal lines 604. The polygon metal feature 604 is electrically connected to the common floating diffusion region 314. The polygon metal feature 604 spans a dimension Dm1 along X direction and a dimension Dm2 along Y direction. Each longitudinal second metal line 604 spans a dimension Dm3 along X direction and a dimension Dm4 along Y direction. In the disclosed embodiments, a ratio Dm3/Dm4 is less than 0.1, and a ratio Dm1/Dm2 ranges between 0.9 and 1.1. Especially, the polygon metal feature 604 and the nearest metal line in the second metal layer (one of the two longitudinal second metal lines 604 in the present embodiment) is spaced away with a distance Ds.

The conversion gain (CG) of the image sensor element 110 is defined as $CG=q/C_{FD}$. In the above formula, q represents the charges accumulated on the floating diffusion region 314. $C_{FD}$ collectively represents capacitances between the conductive features connected to the floating diffusion region 314 and other adjacent conductive features. In order to increase the conversion gain, the corresponding $C_{FD}$ is to be reduced or designed to be less. Through experiments and analysis to the disclosed image sensor device 100, it is identified that the distance Ds between the polygon metal feature 604 and longitudinal second metal lines 604 is a dominating factor to the capacitance $C_{FD}$. In other aspects, the charges accumulated on the floating diffusion region 314 is related to the surface area of photodetector 214, which is determined by Dpx and Dpy since the photodetector 214 substantially fill the surface area of the image sensor element 110. In some embodiments, the surface area of a photodetector 214 is S while the surface area of the image sensor element 110 is Dpx*Dpy, wherein the ratio (Dpx*Dpy)/S is greater than 95%. Furthermore, the dimensions (Dm1 and Dm2) of the polygon metal feature 604 also impacts the distance Ds, contact resistance and alignment margins. If Dm1 and Dm2 are reduced, the distance Ds is increased but the alignment margin is reduced, and the contact resistance is degraded. All above factors are collectively considered in the disclosed design for improved the device performance. In that consideration, another parameter is defined as Dm=Min (Dm1, Dm2, Dm3, Dm4). In the disclosed example, Dm=Dm3.

Through experiments, simulations and collective consideration, the image sensor device 100 is designed with a first ratio of the distance Ds over Dpx (Ds/Dpx) being greater than 0.3. In some embodiments, the first ratio is defined by Dp. In this case, the image sensor device 100 is designed with a first ratio of Ds/Dp being greater than 0.3. Furthermore, a second ratio of the distance Ds/Dm is designed to be greater than 0.4. A third ratio is also defined as Ds/Dv. The image sensor device 100 is designed with a third ratio of Ds/Dv being greater than 0.4. Furthermore, when the interconnect structure includes multiple metal layers and multiple layers of vias to provide vertical connections between adjacent metal layers, those vias may have different sizes. The parameter Dv represents the maximum one of those dimensions of the vias in the interconnect structure.

Figure 10:
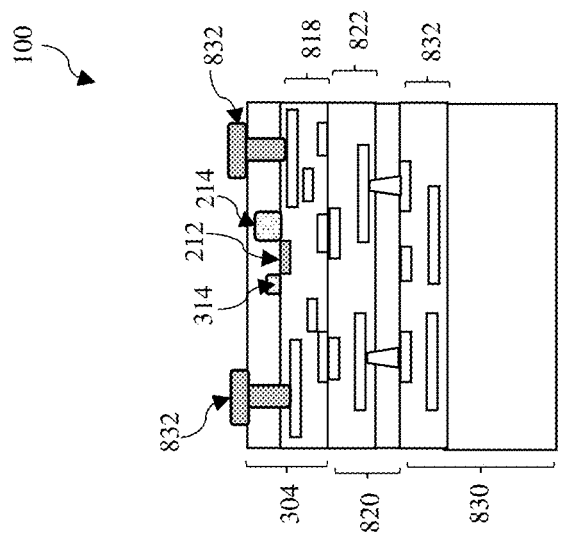

Referring to FIG. 10, as a sectional view of the image sensor device 100 constructed in accordance with some embodiments. The image sensor device 100 is distributed among three substrates bonded together. Particularly, the image sensor device 100 includes the first substrate 304 with photodetectors 214, floating diffusion regions 314, and transfer transistors 212 formed thereon; a second substrate 820 with other components of the image sensor elements 110 formed thereon, such as reset transistors 202, source follower transistors 204 and selector transistors 206; and a third substrate 830 with circuit features, such as logic circuit, memory cells, an application-specific integrated circuit (ASIC), or a combination thereof, formed thereon. In the disclosed embodiments, the substrates 304, 820 and 830 are semiconductor substrates, such as silicon substrates. Especially, the first substrate 304 includes a front side and a back side. Photodetectors 214, floating diffusion regions 314 and transfer transistors 212 are formed on the front side of the first substrate 304. The interconnect structure 800 and the bonding structure 816, collectively referred to by a numeral 818, are formed on the front side of the first substrate 304, such as over the photodetectors 214, floating diffusion regions 314 and transfer transistors 212. The first substrate 304 is thinned down from back side to reduce the thickness so that the photodetectors 214 can avoid the interference of the interconnect structure 800 and with higher transparency to light directed to the backside of the first substrate 304. The light is to be sensed and measured by the photodetectors 214, as described in FIGS. 3A and 3B.

The second substrate 820 includes a front side and a back side, various devices, such as reset transistors 202, source follower transistors 204 and selector transistors 206, are formed on the front side of the second substrate 820. A second interconnect structure and a bonding structure, collectively referred to by a numeral 822, is formed on the front side of the second substrate 820, such as over reset transistors 202, source follower transistors 204 and selector transistors 206. The back side of the second substrate 820 may be thinned down to a less thickness to increase the bonding quality and the device volume. The second substrate 820 is bonded to the first substrate 304 such that the front side of the first substrate 304 is bonded to the front side of the second substrate 820.

The third substrate 830 also includes a front side and a back side, various devices, such as logic circuit and memory cells are formed on the front side of the third substrate 830. A third interconnect structure and a bonding structure, collectively referred to by a numeral 832, may be formed on the front side of the third substrate 830. The third substrate 830 needs to maintain an enough thickness with a mechanical strength to support the bonded structure. The third substrate 830 is bonded to the second substrate 820 such that the front side of the third substrate 830 is bonded to the back side of the second substrate 820.

Various interconnect structures are electrically connected through proper bonding structure, such as hybrid bonding structure as illustrated in FIGS. 12A and 12B, which will be described later. Furthermore, the back side of the first substrate 304 further includes bonding pads 832 to provide electrical routing between the image sensor device 100 and the package or printed circuit board. In some embodiments, the bonding pads 832 include through-substrate vias (TSV) formed by a procedure that includes a lithography patterning process, and an etching process to etch through the first substrate 304, thereby forming through-substrate vias. Then one or more conductive material is filled in the through-substrate vias with top portions designed for respective bonding technology, such as wire-bonding, flip bonding or other suitable bonding.

Figure 11:
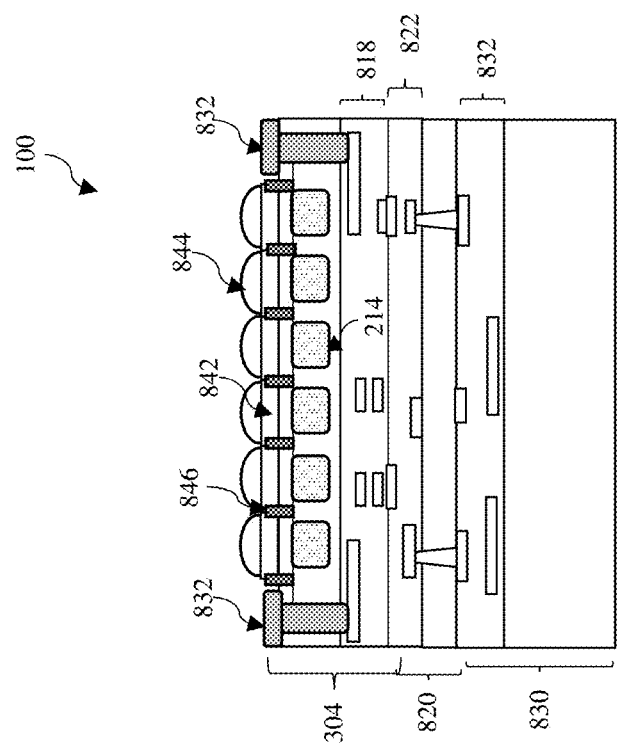

Referring to FIG. 11, as a sectional view of the image sensor device 100 constructed in accordance with some embodiments. The image sensor device 100 in FIG. 11 is similar to the image sensor device 100 in FIG. 10 except for the following differences. Some features, such as micro-lens and color filters, are further illustrated. Some features are not shown for simplicity. FIG. 11 illustrates more image sensor elements 110, therefore more photodetectors 214. However, those are only for illustration and are not intended to be limiting.

As illustrated in FIG. 11, other features may be formed on the back side of the first substrate 304 after the first substrate 304 is thinned down to a suitable thickness by a suitable technology, such as grinding, chemical mechanical polishing (CMP) or a combination thereof.

The image sensor elements 110 of image sensor device 100, described above with reference FIG. 1, may further include a color filter 842 disposed over the back surface of the first substrate 304 and positioned to be vertically aligned with the photodetector 214. The color filters 842 are designed with composition such that light radiation with desired color can pass through and undesired colors are blocked. In some embodiments, the image sensor device 100 includes various image sensor elements 110 designed for sensing light radiation with different colors, such as red, green and blue. In this case, the color filters 842 include different color filters designed with respective compositions such that desired colors pass through. The image sensor elements 110 of image sensor device 100 may further include a micro lens 844 disposed over the back surface of the first substrate 304, such as over the respective color filter 842, and positioned to be vertically aligned with the photodetector 214. The micro lens 844 is designed with composition so be transparent to the light radiation and with a shape so that the light radiation can be properly directed to and focused on the corresponding photodetector 214. In some embodiments, light guide features 846 may be formed and configured between adjacent image sensor elements 110 so to eliminate or reduce the crosstalk between the adjacent image sensor elements 110. The light guide features 846 are designed with shape and size to effectively catch the scattered light radiation from one pixel to adjacent pixels, and with composition to absorb or reflect the light radiation back to the intended pixel. In some embodiments, the light guild features 846 include metal (such as aluminum) and are formed by deposition and patterning process that includes a lithography process and an etching process.

The bonding structure of two substrates, such as the first substrate 304 to the second substrate 820 or the second substrate 820 to the third substrate 830, are further described with reference to FIGS. 12 and 13.

A column-level hybrid bond structure is described with reference to FIG. 12. Referring to FIG. 12(A), a substrate 850, such as a semiconductor substrate 304, 820 or 830 includes various devices or circuit features (such as photodetector, a transistor, and etc.) formed thereon (not shown). An interconnect structure 852 is formed thereon. The interconnect structure 852 includes one or more metal layers, contacts and vias embedded in one or more dielectric material. Particularly, a top metal layer having one or more metal line 856 is formed in one dielectric material layer 855, such as an interlayer dielectric (ILD) layer and is illustrated in FIG. 12(A) and the rest conductive features are collectively referred with a numeral 854. A passivation structure 860 is formed over the interconnect structure 852. The passivation structure 860 includes one or more passivation material layer, and various bonding features formed therein. In the disclosed embodiment, the passivation structure 860 includes a etch stop layer 858 disposed on the top metal layer, two passivation layers 862 and 864 disposed on the etch stop layer 858. In some examples, the passivation layer 862 includes silicon oxide and the passivation layer 864 includes silicon oxynitride.

Referring to FIG. 12(B), a trench 866 is formed in the passivation layers 862 and 864 such that the top metal line 856 is exposed in the trench 866. The trench 866 is designed to define a redistribution layer so that the bonding pad is routed from the top metal feature 856 to the bonding pad.

Referring to FIG. 12(C), one or more conductive material, such as copper, gold, chromium, or a combination thereof, is deposited in the trench 866 and CMP process may be further applied to remove excessive conductive material, thereby forming the redistribution layer and bonding pad, collectively referred to as a bonding structure 868. An etching process may be further applied to recess the passivation layer(s) for improved bonding effect. Such processed substrate with bonding pad can be used to bond to another substrate with similar bonding structure.

A pixel-level hybrid bond structure is described with reference to FIG. 13. The structure and process are similar to those in FIG. 12. Similar descriptions are eliminated for simplicity. Referring to FIG. 13(A), the passivation structure 860 is similar to the passivation structure in FIG. 12 and may include more or less passivation layers. In the disclosed embodiments, the passivation structure 860 includes etch stop layers 858 and 872, and passivation layers 870, 862 and 864 disposed as illustrated in FIG. 13(A). In some embodiments, the etch stop layer include silicon nitride, and the passivation layers include silicon oxide, silicon oxide and silicon oxynitride, respectively. A hybrid bond contact hole 874 is formed in the passivation layers by patterning such that the top metal line 856 is exposed in the hybrid bond contact hole 874.

Referring to FIG. 13(B), A hybrid bond trench 876 is formed in the passivation layers by patterning that includes a lithography process and etching.

Referring to FIG. 13(C), one or more conductive material, such as copper, gold, chromium, or a combination thereof, is deposited in hybrid bond trench 876 and the hybrid bond contact hole 874. A CMP process may be further applied to remove excessive conductive material, thereby forming a hybrid bond layer and a hybrid bond contact, collectively referred to by a bonding structure 878. An etching process may be further applied to recess the passivation layer(s) for improved bonding effect. Such processed substrate can be used to bond to another substrate with similar bonding structure.

Figure 14:
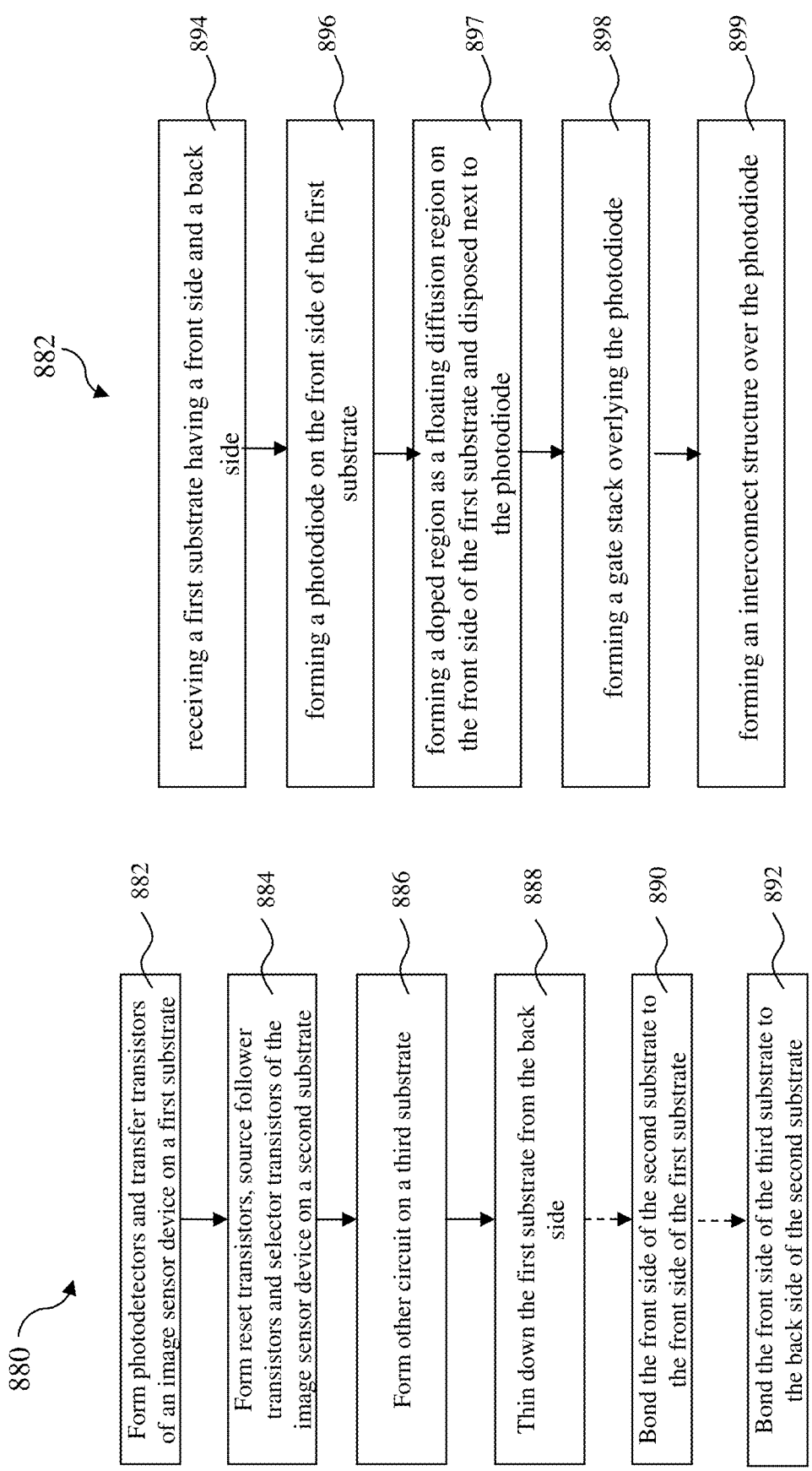
FIG. 14 is a flowchart illustrating an embodiment of a method of fabricating a backside-illuminated image sensor device according to some embodiments.

Referring now to FIG. 14, illustrated is a method 880 of fabricating an image sensor device 100 constructed according to some embodiments. The method 880 includes an operation 882 to form photodetectors 214 and transfer transistors 212 of an image sensor device 100 on a first substrate 304. Especially, the image sensor device 100 includes a plurality of image sensor elements 110, in an array, each element having a photodetector 214, a transfer transistor 212 and a floating diffusion region 314 shared with adjacent image sensor elements. The method 880 includes an operation 884 to form reset transistors, source follower transistors and selector transistors of the image sensor device 100 on a second substrate 820. The method 880 includes an operation 886 to form other circuit, such as ASIC, on a third substrate 830. The method 880 includes an operation 888 to thin down the first substrate 304 from the back side. The method 880 includes an operation 890 to bond the front side of the second substrate 820 to the front side of the first substrate 304. The method 880 further includes an operation 892 to bond the front side of the third substrate 830 to the back side of the second substrate 820. Particularly, the operation 882 includes various sub-operations to form photodetectors, a common floating diffusion region, and gate stacks of the transfer transistors on the front side of the first substrate; and to form an interconnect structure including a second metal layer with a first metal feature connected to the common floating diffusion region and an adjacent metal line spaced a distance, as described above with other figures. In some embodiments, the operation 882 includes an operation 894 by receiving a first substrate having a front side and a back side; an operation 896 by forming a photodiode on the front side of the first substrate; an operation 897 by forming a doped region as a floating diffusion node on the front side of the first substrate and disposed next to the photodiode; and an operation 898 by forming a gate stack overlying the photodiode, wherein the gate structure includes a gate dielectric layer and a gate electrode over the gate dielectric layer, and the gate stack being partially landing on the photodiode. An operation 899 includes forming an interconnect structure over the photodiode, wherein the interconnect structure includes a first metal layer and a second metal layer over the first metal layer, the second metal layer includes a first metal feature and a second metal feature spaced a distance Ds along the first direction, the first metal feature is positioned on the vertex and extends to each of the four image sensor cells, the first metal feature is electrically connected to the doped feature of the each of the four image sensor cells, and a first ratio Ds/Dp is greater than 0.3.

Figure 15:
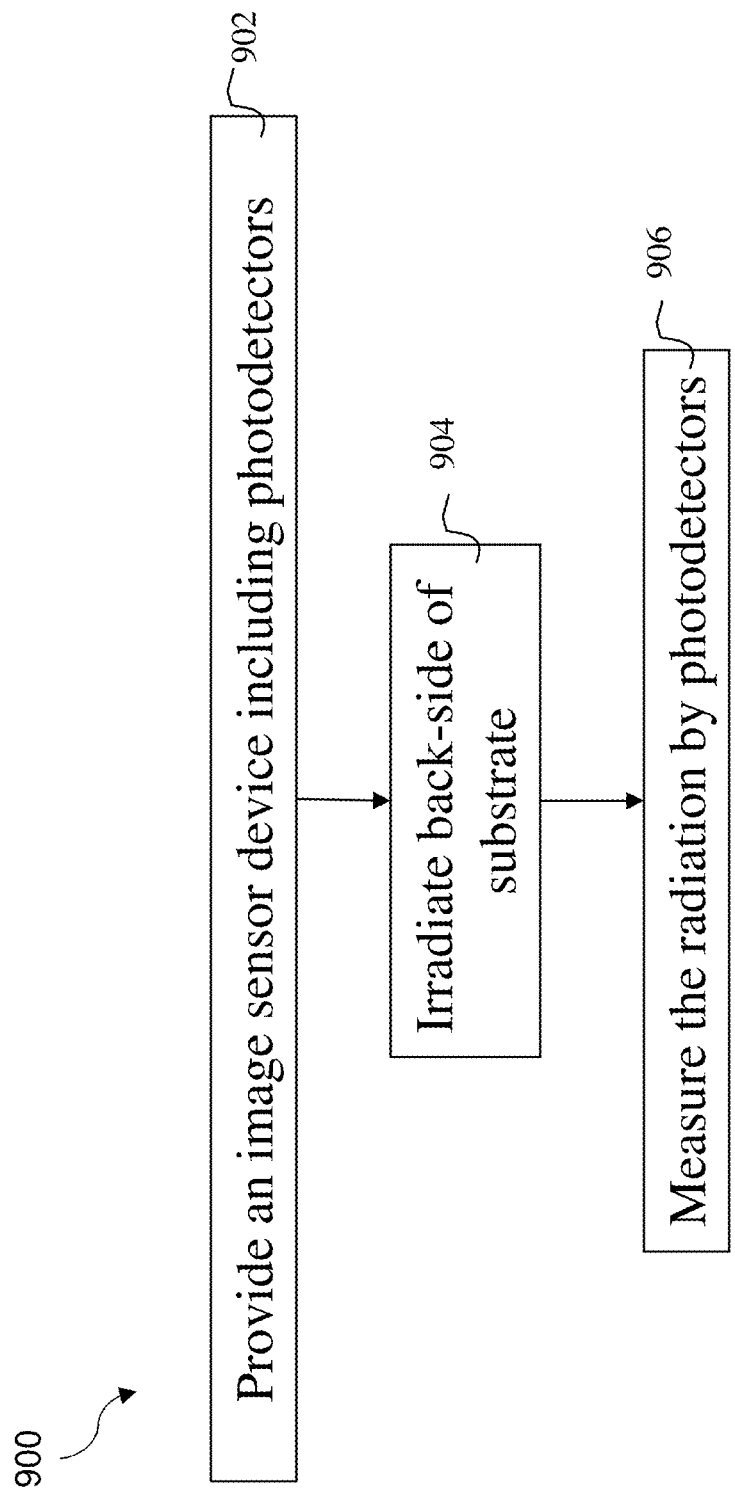
FIG. 15 is a flowchart illustrating an embodiment of a method of operating a backside-illuminated image sensor.

Referring now to FIG. 15, illustrated is a method 900 for operation of a backside-illuminated image sensor device. The method 900 begins at step 902 where an image sensor device 100 is provided. The method 900 then proceeds to step 904 where the backside of the substrate 304 is irradiated. The method 900 includes step 906 where the radiation is measured by photodetectors. The radiation may be a visual light beam, an infrared (IR) beam, an ultraviolet (UV) beam, and/or other proper radiation beam. The reflected radiation is directed towards the image sensor elements 110 of the image sensor device 100. The method 900 may allow for increasing the amount of absorbed radiation, which leads to increased sensitivity of the image sensor device.

The present disclosure provides an image sensor device having a plurality of image sensor elements configured in an array. Various features of the image sensor device is distributed among three substrates bonded together. The image sensor elements are configured with a common floating diffusion region, and an interconnect structure formed on the front side of the first substrate. The interconnect structure includes two or more metal layers with a second metal layer including a first metal feature connected to the common floating diffusion region and an adjacent metal line of the second metal layer spaced a distance designed such that a ratio Ds/Dp is greater than 0.3. Wherein the Dp is the dimension of the photodetector and Ds is the spacing between the first metal feature and the adjacent metal line of the second metal layer. By implementing the disclosed structure and the method making the same, the device performance is enhanced, such as conversion gain is increased.

In one example aspect, the present disclosure provides an image sensor structure. The image sensor structure includes a first substrate having a front side and a back side; a photodetector disposed on the front side of the first substrate and spanning a dimension Dp along a first direction; a gate electrode formed on the front side of the first substrate and partially overlapping the photodetector; a doped region as a floating diffusion region formed on the front side of the first substrate and disposed next to the photodetector; and an interconnect structure disposed on the front surface of the first substrate and overlying the gate electrode. The interconnect structure includes a first metal layer and a second metal layer over the first metal layer, the second metal layer further includes a first metal feature and a second metal feature distanced a distance Ds along the first direction, the first metal feature is electrically connected to the doped feature, and a first ratio Ds/Dp is greater than 0.3.

In another example aspect, the present disclosure provides an image sensor structure. The image sensor structure includes a first substrate having a front side and a back side; four image sensor cells configured in an array and sharing a common vertex; and an interconnect structure disposed on the front surface of the first substrate. Each of the four image sensor cells includes a photodetector disposed on the front side of the first substrate and spanning a dimension Dp along a first direction, a doped region as a floating diffusion region formed on the front side of the first substrate and disposed next to the photodetector, and a gate stack formed on the front side of the first substrate, the gate stack including a gate dielectric layer and a gate electrode over the gate dielectric layer, and the gate stack being partially landing on the photodetector. The interconnect structure includes a first metal layer and a second metal layer over the first metal layer, the second metal layer includes a first metal feature and a second metal feature spaced a distance Ds along the first direction, the first metal feature is positioned on the vertex and extends to each of the four image sensor cells, the first metal feature is electrically connected to the doped feature of the each of the four image sensor cells, and a first ratio Ds/Dp is greater than 0.3.

In yet another example aspect, the present disclosure provides a method making an image sensor structure. The method includes receiving a first substrate having a front side and a back side; forming a photodiode on the front side of the first substrate; forming a doped region as a floating diffusion region on the front side of the first substrate and disposed next to the photodiode; forming a gate stack overlying the photodiode, wherein the gate structure includes a gate dielectric layer and a gate electrode over the gate dielectric layer, and the gate stack being partially landing on the photodiode; and forming an interconnect structure over the photodiode. The interconnect structure includes a first metal layer and a second metal layer over the first metal layer, the second metal layer includes a first metal feature and a second metal feature spaced a distance Ds along the first direction, the first metal feature is positioned on the vertex and extends to each of the four image sensor cells, the first metal feature is electrically connected to the doped feature of the each of the four image sensor cells, and a first ratio Ds/Dp is greater than 0.3.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image sensor structure, comprising:
   a first substrate having a front side and a back side;
   a photodetector disposed on the front side of the first substrate and spanning a dimension Dp along a first direction;
   a gate electrode formed on the front side of the first substrate and partially overlapping the photodetector, the gate electrode spanning between a first edge and a second edge along the first direction;
   a doped region as a floating diffusion region formed on the front side of the first substrate and configured such that the gate electrode is interposed between the photodetector and the doped region, wherein the photodetector contacts the first edge of the gate electrode and the doped region contact the second edge of the gate electrode; and
   an interconnect structure disposed on the front side of the first substrate and overlying the gate electrode, wherein
   the interconnect structure includes a first metal layer and a second metal layer over the first metal layer,
   the second metal layer further includes a first metal feature and a second metal feature, wherein the first and second metal features are distanced from each other with a spacing Ds therebetween along the first direction,
   the first metal feature is electrically connected to the doped region and the second metal feature is electrically connected to the gate electrode, and
   a first ratio Ds/Dp is greater than 0.3.

2. The image sensor structure of claim 1, wherein
   the first metal feature spans a dimension Dm1 along the first direction;

the first metal feature spans a dimension Dm2 along a second direction being perpendicular to the first direction;

the second metal feature spans a dimension Dm3 along the first direction and a dimension Dm4 along the second direction;

a Dm is defined as the smallest of Dm1, Dm2, Dm3, and Dm4; and a second ratio Ds/Dm is greater than 0.4.

3. The image sensor structure of claim 2, wherein
a third ratio Dm1/Dm2 ranges between 0.9 and 1.1; and
a fourth ratio Dm3/Dm4 is less than 0.1.

4. The image sensor structure of claim 2, wherein
the interconnect structure further includes a via vertically connecting the first and second metal layers; and
the via spans a dimension Dv with a ratio Ds/Dv being greater than 0.4.

5. The image sensor structure of claim 4, wherein
the photodetector spans between a third edge and a fourth edge along the first direction; and
the first edge is distanced from the third and fourth edges of the photodetector such that the first edge is between the third and fourth edges in a top view.

6. The image sensor structure of claim 1, wherein the doped region is connected to a reset transistor.

7. The image sensor structure of claim 6, further comprising a second substrate having a front side and a back side, wherein the reset transistor is formed on the second substrate, and wherein the front side of second substrate is bonded to the front side of the first substrate.

8. The image sensor structure of claim 7, further comprising a third substrate having a front side and a back side, wherein the front side of third substrate is bonded to the back side of the second substrate.

9. The image sensor structure of claim 1, wherein
the interconnect structure further includes a contact layer underlying the first metal layer, and a via layer interposed between the first and second metal layers; and
the first metal feature is electrically connected to the doped region through one contact of the contact layer, one metal feature of the first metal layer, and one via feature of the via layer.

10. The image sensor structure of claim 1, wherein the gate electrode, in a top view, includes a triangle shape and is partially overlapped with the first metal feature.

11. The image sensor structure of claim 1, wherein the photodetector includes a pinned-photodiode.

12. The image sensor structure of claim 1, comprising four image sensor cells configured in an array with a common vertex of the four image sensor cells, wherein the first metal feature is overlapped with the common vertex in a top view and extends to each of the four image sensor cells.

13. An image sensor structure, comprising:
a first substrate having a front side and a back side;
four image sensor cells configured in an array and sharing a common vertex; and
an interconnect structure disposed on the front side of the first substrate, wherein each of the four image sensor cells includes
a photodetector disposed on the front side of the first substrate and spanning a dimension Dp along a first direction,
a doped region as a floating diffusion region formed on the front side of the first substrate and configured such that the gate electrode is interposed between the photodetector and the doped region, wherein the photodetector contacts the first edge of the gate electrode and the doped region contact the second edge of the gate electrode, and a gate stack formed on the front side of the first substrate, the gate stack including a gate dielectric layer and a gate electrode over the gate dielectric layer, and the gate stack being partially landing on the photodetector, wherein the gate electrode spanning between a first edge and a second edge along the first direction, the interconnect structure includes a first metal layer and a second metal layer over the first metal layer, the second metal layer includes a first metal feature and a second metal feature, wherein the first and second metal features are distanced from each other with a spacing Ds therebetween along the first direction, the first metal feature is positioned on the vertex and extends to each of the four image sensor cells, the first metal feature is electrically connected to the doped region of the each of the four image sensor cells and the second metal feature is electrically connected to the gate electrode, and a first ratio Ds/Dp is greater than 0.3.

14. The image sensor structure of claim 13 wherein the first metal feature spans a dimension Dm1 along the first direction, and wherein a second ratio Ds/Dm1 is greater than 0.3.

15. The image sensor structure of claim 14, wherein
the first metal feature spans a dimension Dm2 along a second direction being perpendicular to the first direction; and
a third ratio Dm1/Dm2 ranges between 0.9 and 1.1.

16. The image sensor structure of claim 15, wherein
the second metal feature spans a dimension Dm3 along the first direction and a dimension Dm4 along the second direction; and
a fourth ratio Dm3/Dm4 is less than 0.1.

17. The image sensor structure of claim 16, wherein
the photodetector spans between a third edge and a fourth edge along the first direction;
the first edge is distanced from the third and fourth edges of the photodetector such that the first edge is between the third and fourth edges in a top view;
the doped region of the one of the four image sensor cells is connected to a reset transistor of the one of the four image sensor cells.

18. The image sensor structure of claim 17, further comprising
a second substrate having a front side and a back side, wherein the reset transistor is formed on the second substrate, and wherein the front side of second substrate is bonded to the front side of the first substrate; and
a third substrate having a front side and a back side, wherein the front side of third substrate is bonded to the back side of the second substrate.

19. An image sensor structure, comprising:
a first substrate having a front side and a back side;
a photodetector disposed on the front side of the first substrate and spanning a dimension Dp along a first direction;
a doped region as a floating diffusion region formed on the front side of the first substrate;
a gate electrode disposed on the front side of the first substrate and partially landing on the photodetector, the gate electrode spanning between a first edge and a second edge along the first direction; and an interconnect structure disposed on the front side of the first substrate and overlying the gate electrode, wherein the doped region is configured such that the gate electrode is interposed between the photodetector and the doped region, wherein the photodetector contacts the first edge of the gate electrode and the doped region contact the second edge of the gate electrode the interconnect structure includes a first metal layer and a second metal layer over the first metal layer, the second metal layer further includes a first metal feature and a second metal feature, wherein the first and second metal features are distanced from each other with a spacing Ds therebetween along the first direction, the first metal feature is electrically connected to the doped region, the second metal feature is electrically connected to the gate electrode, the doped region is connected to a reset transistor, and a first ratio Ds/Dp is greater than 0.3.

20. The image sensor structure of claim 19, wherein the gate electrode, in a top view, includes a triangle shape and is partially overlapped with the first metal feature, wherein the first metal feature spans a dimension Dm1 along the first direction;

the first metal feature spans a dimension Dm2 along a second direction being perpendicular to the first direction;

the second metal feature spans a dimension Dm3 along the first direction and a dimension Dm4 along the second direction;

a Dm is defined as the smallest of Dm1, Dm2, Dm3, and Dm4;

a second ratio Ds/Dm is greater than 0.4;

a third ratio Dm1/Dm2 ranges between 0.9 and 1.1; and a fourth ratio Dm3/Dm4 is less than 0.1.

* * * * *